(No Model.)
H. H. DRAPER.
BICYCLE SUPPORT.
No. 606,128. Patented June 21, 1898.
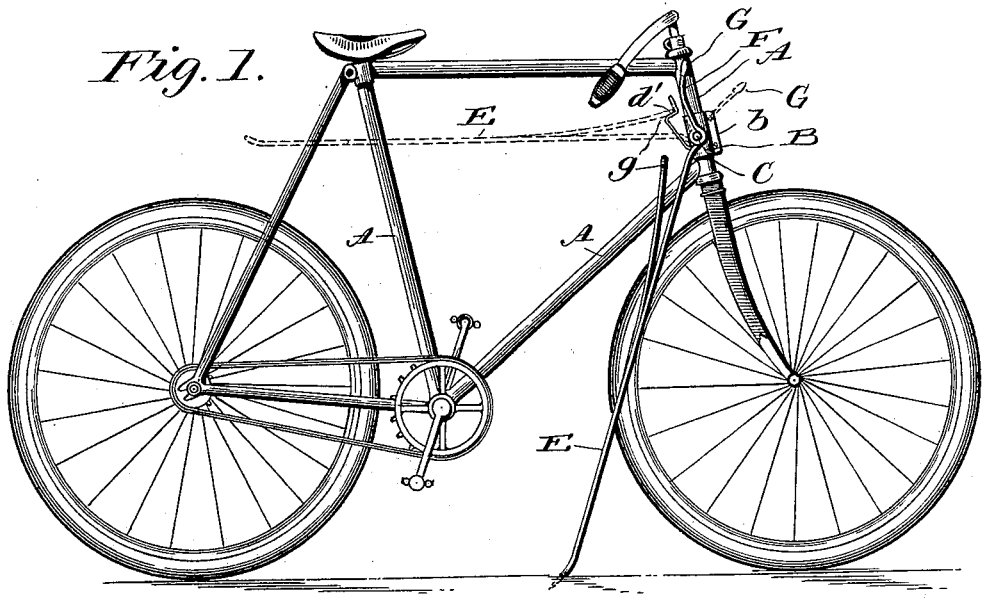
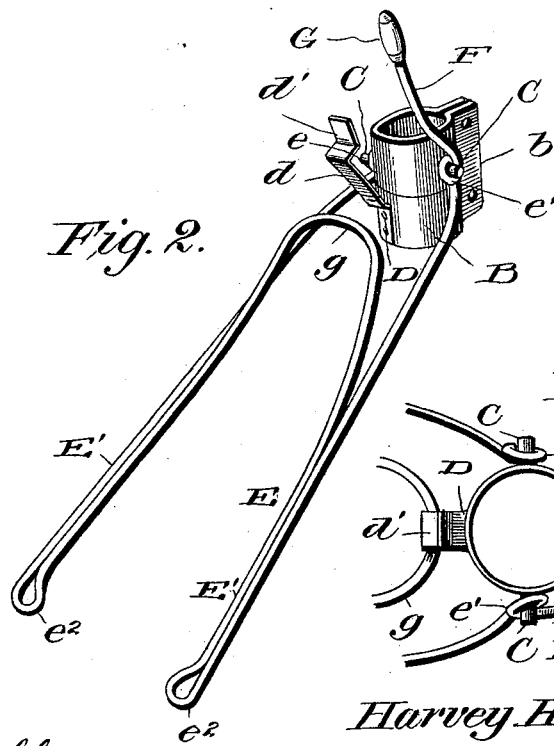
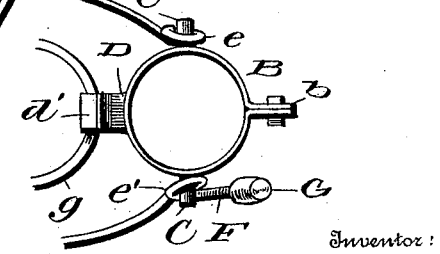
Witnesses
L. C. Hills
E. H. Bond
Inventor:
Harvey H. Draper
By William Walker
Attorney

UNITED STATES PATENT OFFICE

HARVEY H. DRAPER, OF ARKANSAS CITY, KANSAS.

BICYCLE-SUPPORT.

SPECIFICATION forming part of Letters Patent No. 606,128, dated June 21, 1898.

Application filed November 18, 1897. Serial No. 658,968. (No model.)

*To all whom it may concern:*

Be it known that I, HARVEY H. DRAPER, a citizen of the United States, residing at Arkansas City, in the county of Cowley and State of Kansas, have invented certain new and useful Improvements in Bicycle-Supports; and I do hereby declare the following to be a full, clear, and exact description of the invention, such as will enable others skilled in the art to which it appertains to make and use the same.

This invention relates to certain new and useful improvements in bicycle attachments of that character designed to be applied to the machine and adapted to support the same in a standing position when desired and when not thus employed thrown up out of the way.

It has for its object, among others, to provide a simple and cheap device of this character that can be easily applied to any style of bicycle and quickly operated without the necessity of the rider getting off the machine. It comprises a light, preferably wire, device bent into the desired shape and formed with coils, loops, or the like adapted to engage over pins or lateral projections on a sleeve which is designed to be detachably engaged over the bar of the frame to which the attachment is to be applied, one end of the wire being extended to form a handle by which the attachment is thrown into operative position, or vice versa. On the sleeve is a spring for holding the attachment in its folded or inoperative position.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a side elevation of a bicycle equipped with my improvement. Fig. 2 is a perspective view of the attachment removed. Fig. 3 is a view in top plan, showing the sleeve with its spring and a portion of the support, the latter shown as about being thrown up into its inoperative position.

Like letters of reference indicate like parts throughout the several views.

Referring now to the details of the drawings by letter, A designates the frame of a bicycle, and while my attachment may be applied to any desired portion thereof it is in this instance shown as applied to the front post and adapted to be thrown up to the rear.

The attachment consists of the sleeve B, adapted to be detachably applied to the post, and is shown as having ears $b$, through which pass the securing means by which the same is clamped on the post. This sleeve may be in one or more parts, as may be found most convenient. It is of course of resilient material to allow of its being easily applied about the post. Projecting from opposite sides of this sleeve at right angles to the length of the machine are the pins or studs or projections C, the object of which will soon appear. Projecting from the rear face of the sleeve, as seen in the different views, is the spring-plate D, which is attached at its lower end in any suitable manner to the sleeve and from its point of attachment extending upward and outward from the sleeve to form the inclined portion $d$, and near its upper end it is bent to form the substantially horizontal shoulder or projection $d'$, which serves as a support for the rest or support when the latter is thrown up into its horizontal position, as seen in dotted lines in Fig. 1.

E is the rest or support. It is formed by preference of a single piece of wire of suitable diameter having one end bent to form the loop or coil $e$, which is designed to be engaged over one of the pins or projections C and the other end bent to form a similar loop or coil or eye $e'$ in the same horizontal plane to engage over the other pin or projection C on the sleeve, and this end is then extended and formed into a handle F, which may or may not be provided with a grip or the like, as seen at G. The wire forming the support or rest is formed into the double legs E', and at their lower ends the same are bent, as at $e^2$, to form the extended bearing-surfaces, and these are slightly turned to the rear, as seen best in Fig. 1, so that when the rest is in its operative position, should the wheel move forward, there will be no tendency to stop the same and thus throw the rider. The wire is extended between the leg portions and bent upon itself, as seen at g, to form the central spring portion, which is designed to be engaged with the shoulder of the spring when the support is thrown upward, as seen by dotted lines in Fig. 1.

The manner of use will be apparent. Ordinarily the support is in the position in which it is shown by dotted lines in Fig. 1. When the rider desires to stop and talk with a person without getting from the machine, all that it is necessary to do is to pull on the lever or handle, when the support will be thrown into the position shown by full lines in said Fig. 1. As the lever or handle is moved forward into the position in which it is seen in dotted lines the support is thrown up into its horizontal position, and the central spring portion of the same will be engaged with the inclined surface of the spring, and the latter will yield and so will the curved part of the support until the latter reaches a point above the shoulder, when the spring will fly back and the support will be held in its horizontal position by reason of the engagement of the bend g with the shoulder of the spring, as seen clearly in Fig. 1 by said dotted lines. Movement of the handle to the rear serves to throw the bent part of the support or rest slightly to the rear, so that it is easily disengaged from the shoulder.

The support is quickly applied or removed, its coils or loops easily engaging over or being disengaged from the pins or projections C on the sleeve, as will be readily understood.

Modifications in detail may be resorted to without departing from the spirit of the invention or sacrificing any of its advantages.

The foot or toe may be pointed or sharpened to prevent the same from slipping in icy weather. It will also be understood, of course, that other material than wire may be employed in the construction of the support.

What I claim as new is—

1. A bicycle-support comprising a sleeve having lateral projections, a support detachably pivotally mounted thereon and having a central spring portion in proximity to its pivot and an extended portion forming a handle, and a spring on the sleeve for engaging the support to hold it in its inoperative position, substantially as specified.

2. A bicycle attachment comprising a sleeve with attaching means, projections extending laterally from the sleeve, a support of spring-wire having a central spring portion in proximity to its pivot and loops detachably and pivotally engaged with said projections, and a spring-plate attached to the sleeve at right angles to the projections and having a shoulder to engage the support when the latter is in its horizontal position, substantially as specified.

3. The combination with a sleeve having lateral projections on opposite sides thereof, and a spring-plate on its rear side and having an inclined portion and a shoulder, of a support formed of a single piece of resilient material formed near each end with a coil to engage detachably over said projections and one end extended to form a handle, the support being formed with a central spring portion having a bend to engage over the said shoulder of the spring on the sleeve, substantially as and for the purpose specified.

In testimony whereof I affix my signature in presence of two witnesses.

HARVEY H. DRAPER.

Witnesses:
    J. E. ROSEBERRY,
    J. L. HOWARD.